Figure 1:
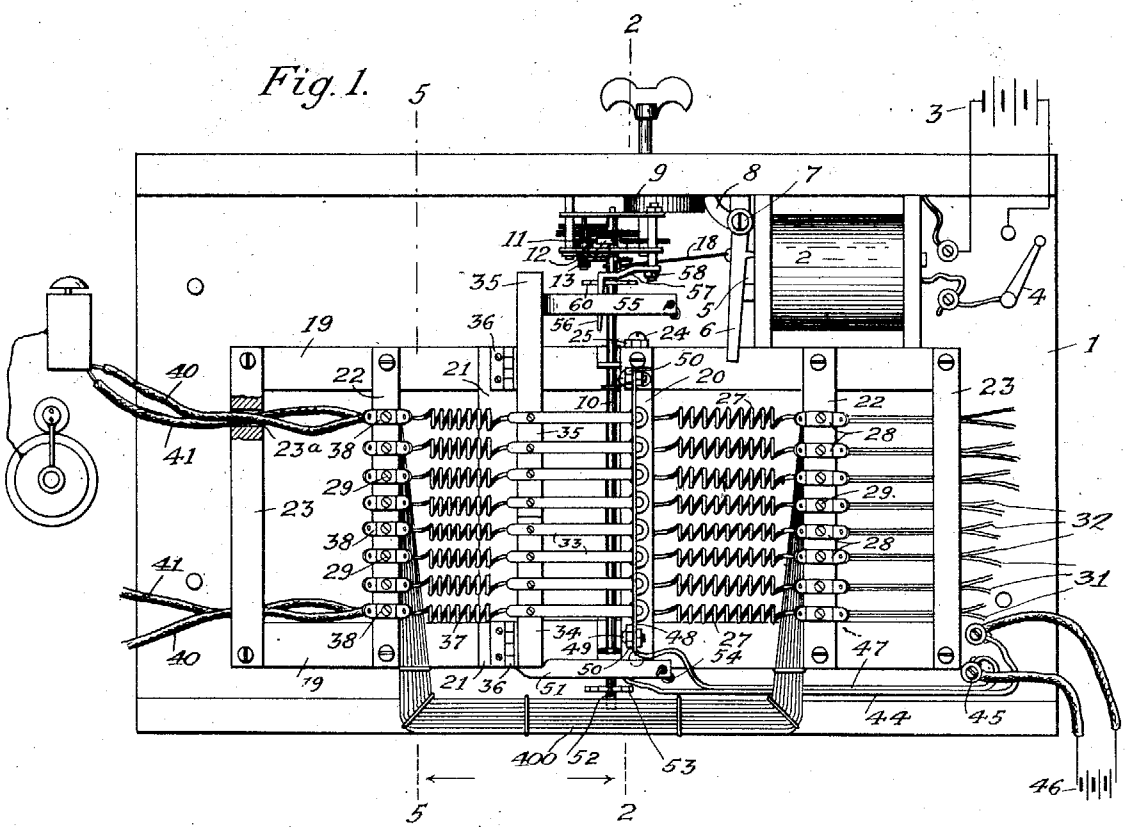

L. A. MEYERS.

AUTOMATIC FIRE AND BURGLAR ALARM.

APPLICATION FILED MAR. 5, 1915.

Reissued Apr. 17, 1917.

14,288.

4 SHEETS—SHEET 1.

Witnesses:
Thos. Lagaard.
A. M. Royal

Inventor:
Louis A. Meyers.
By R. G. Whitney
his Attorney

L. A. MEYERS.

AUTOMATIC FIRE AND BURGLAR ALARM.

APPLICATION FILED MAR. 5, 1915.

Reissued Apr. 17, 1917.

14,288.

4 SHEETS—SHEET 2.

Witnesses:
Theo. Lagaard
A. M. Royal

Inventor:
Louis A. Meyers.
By F. O. Whitelley
his Attorney.

L. A. MEYERS.

AUTOMATIC FIRE AND BURGLAR ALARM.

APPLICATION FILED MAR. 5, 1915.

Reissued Apr. 17, 1917.

14,288.

4 SHEETS—SHEET 3.

Witnesses:
Theo. Lagaard
A. M. Royal

Inventor:
Louis A. Meyers.
By F. A. Whiteley
his Attorney.

L. A. MEYERS.

AUTOMATIC FIRE AND BURGLAR ALARM.

APPLICATION FILED MAR. 5, 1915.

Reissued Apr. 17, 1917.

14,288.

4 SHEETS—SHEET 4.

Witnesses:
Thos. Lagnard
A. M. Royal

Inventor
Louis A. Meyers.
By A. A. Whiteley
his Attorney.

UNITED STATES PATENT OFFICE.

LOUIS A. MEYERS, OF SAUK CENTER, MINNESOTA, ASSIGNOR, BY MESNE ASSIGNMENTS, OF ONE-HALF TO VOLUNTEER FIREMEN'S SIGNAL COMPANY, A CORPORATION OF MINNESOTA.

AUTOMATIC FIRE AND BURGLAR ALARM.

14,288. Specification of Reissued Letters Patent. Reissued Apr. 17, 1917.

Original No. 1,084,100, dated January 13, 1914, Serial No. 763,853, filed April 26, 1913. Application for reissue filed March 5, 1915. Serial No. 12,433.

*To all whom it may concern:*

Be it known that I, LOUIS A. MEYERS, residing at Sauk Center, in the county of Stearns and State of Minnesota, have invented certain new and useful Improvements in Automatic Fire and Burglar Alarms, of which the following is a specification.

My invention relates to automatic fire and burglar alarms, and has for its object to provide a device to be introduced into the telephone system whereby the usual telephone circuits and telephone bells may be utilized for sounding an independent alarm. This may be done with peculiar effectiveness for the purpose of arousing the members of volunteer fire corps in small cities and villages where a trained fire department force does not exist. In accomplishing this purpose my device will include the telephone circuits of each member of the fire department, and when set in operation will automatically and substantially simultaneously ring the telephone bells of all of the members of said volunteer fire company, such ringing being effected in the manner best calculated to give the desired alarm, either by a series of rings with short rests between the same, or otherwise as may be desired.

A further object of the invention is to employ the same in hotels, apartments and office buildings where an independent switchboard is in use whereby the device will automatically cause each and every telephone in the building in connection with said switchboard to sound an alarm after the device has once been set in operation. This may be done for the purpose of giving an alarm of fire, for the purpose of indicating a rising time or a time to go to work, or for any purpose in which it is desirable to simultaneously notify persons in all of the rooms of a building.

A further object of the invention is to provide a device of this character which is comparatively simple and inexpensive in its construction, which can be readily introduced into the usual telephone circuits which can be instantly set in operation and then requires no further attention on the part of the operator, and which will not interfere with the use of the telephone in the usual manner.

The full objects and advantages of my invention will appear in connection with a detailed description thereof and are particularly pointed out in the appended claims.

In the drawings, illustrating the application of my invention in one form,—

Figure 2:
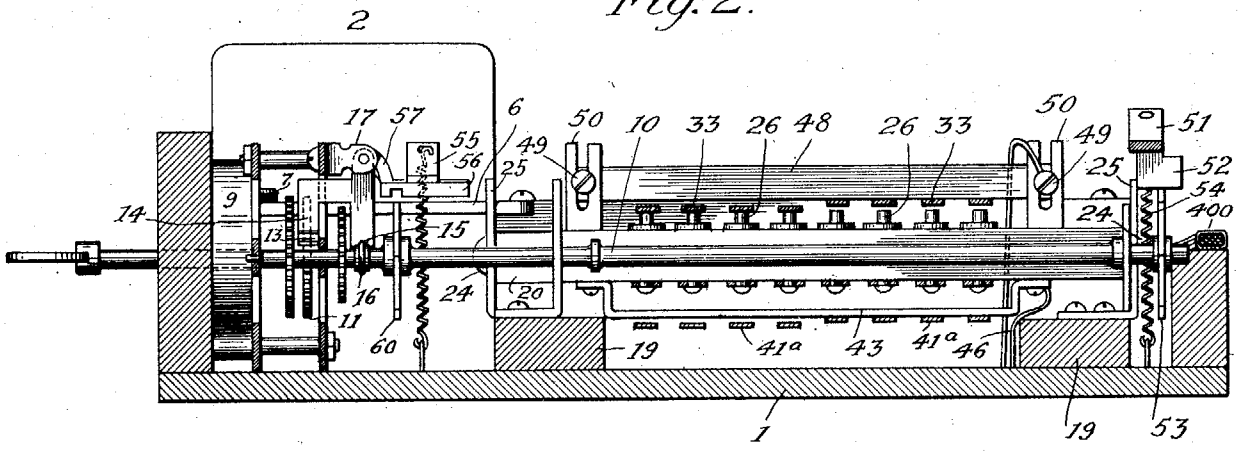
Figure 3:
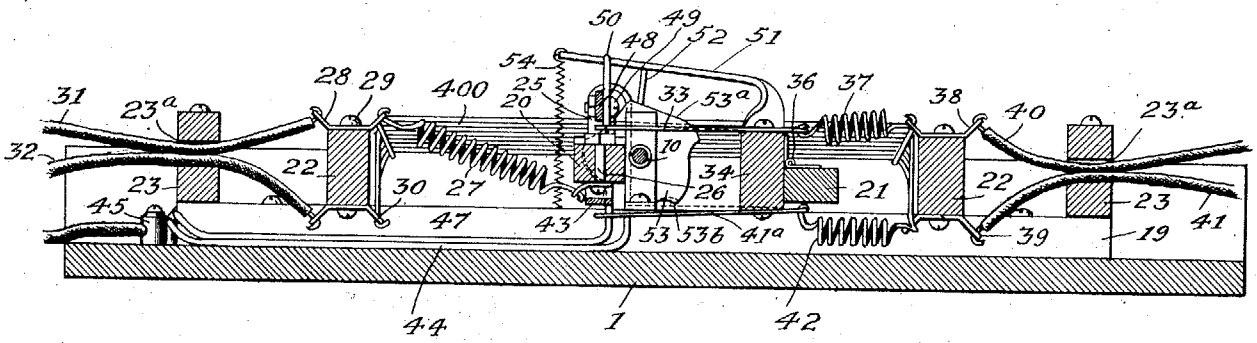
Figure 4:
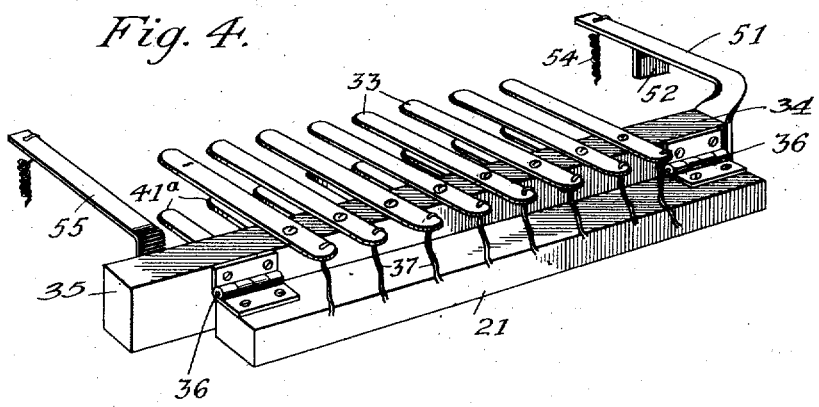
Figure 5:
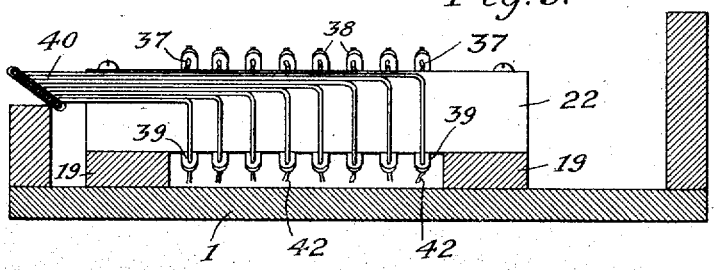
Figure 6:
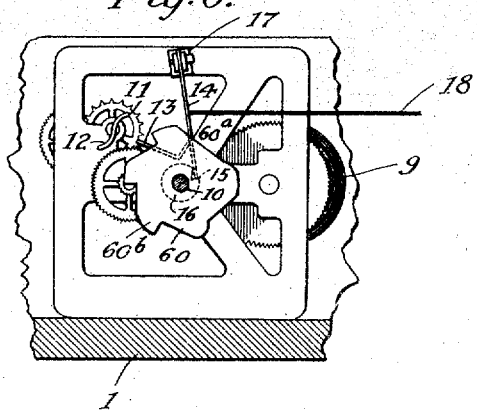

Figure 1 is a top plan view of an automatic fire and burglar alarm constructed in accordance with the invention. Fig. 2 is an enlarged transverse sectional view through the same on the line 2—2 of Fig. 1. Fig. 3 is a longitudinal sectional view through the device, the contact fingers being shown by full lines in the position normally assumed when the regular telephone circuits are closed, and by dotted lines in the position assumed when the telephone circuits are broken and the ringing circuit is placed in connection with the telephone for sounding an alarm. Fig. 4 is a detail perspective view of the rocking bars and contact fingers. Fig. 5 is a transverse sectional view on the line 5—5 of Fig. 1. Fig. 6 is an elevation of the spring motor and one of the notched disks upon the main operating shaft for actuating the rocking bars when the device is in operation.

In the practice of my invention, as will hereinafter be pointed out, I provide certain terminals for the main telephone wires and other terminals for the corresponding circuits; and I provide movable members normally held to contact with the line circuit terminals so as to complete the circuits for ordinary uses of the telephone, together with means for moving these members simultaneously so as to change the contacts and ring a selected number of telephones simultaneously.

Referring to the drawings, the numeral 1 designates a suitable base upon which the mechanism is mounted. An electromagnet 2 is mounted upon one side of the base, the said magnet being connected to the terminals of a suitable circuit 3 and the circuit being provided with some conventional form of switch 4 by means of which the circuit can be closed and the magnet energized at any time. When the magnet is energized it attracts armature 5 upon an actuating lever 6, the end of the lever being pivoted at 7 upon a suitable bracket 8.

A suitable spring motor 9 which is adapted to be set in motion by the actuation of the lever 6 is provided for driving the main shaft 10 of the mechanism. This spring motor 9 may be of any suitable construction, and is shown in the present instance as including a toothed governor wheel 11 which is provided with the resistance wings 12. (See Figs. 2 and 6). The teeth of the governor wheel 11 are adapted to be engaged by a detent 13 which is carried by a spring arm 14, the said spring arm having the extremity thereof normally seated in a notch 15 formed in the periphery of a disk 16 which is rigid with the main shaft 10. The upper end of the spring arm 14 is rigidly secured to a bracket 17 projecting from the frame of the spring motor 9, while the middle portion of the said spring arm is connected by a suitable link 18 to the beforementioned releasing lever 6. It will thus be obvious that when the electro-magnet 2 is energized so as to attract the armature 5 and actuate the releasing lever 6, the spring arm 14 will be disengaged from the notch 15 of the disk 16 and the detent 13 simultaneously withdrawn from engagement with the teeth of the governor wheel 11. The spring motor 9 will thus be set in operation so as to carry the notch 15 away from the extremity of the spring arm 14 and the said spring arm 14 will then ride upon the periphery of the disk 16 and withhold the detent 13 from engagement with the teeth of the governor wheel 11 until the main operating shaft 10 has completed one revolution and the notch 15 is again brought into proper position to be entered by the spring arm 14. When the spring arm again enters the notch 15 and thus returns to normal position, the detent 13 will be caused to engage the teeth of the governor wheel 11 so as to stop the motor.

In the specific embodiment of the invention illustrated by the drawings, the numerals 19 designate a pair of longitudinal sills or strips which are mounted upon the base 1, intermediate portions of the strips being connected by the transverse contact bar 20 and the hinge bar 21, while the opposite end portions of the strips 19 are connected by the transverse terminal bars 22 and the perforated bars 23. The contact bar 20 is adjustably mounted so as to be raised and lowered, the ends of the bar being shown as provided with clamping screws 24 which operate within slotted standards 25 projecting upwardly from the longitudinal strips 19. It will thus be obvious that the contact bar 20 may be properly adjusted to any desired elevation and then securely clamped in position by tightening the screws 24. A set of bolts or pins 26 extend vertically through the contact bar 20, there being one of the bolts or pins provided for each telephone circuit.

The instrument illustrated upon the drawings is designed to be employed where there are eight telephone circuits and eight independent alarms to be sounded.

The lower ends of the bolts or pins 26 are connected by conductors 27 to corresponding terminal members 28 which are mounted upon the top of the adjacent terminal bar 22. These terminal members 28 are shown as in the form of metal strips which are fastened to the bar 22 by suitable members such as the screws 29, the extremities of the metal strips being extended upwardly so as to have the wires conveniently attached thereto. Similar and corresponding terminal members 30 are secured to the lower face of the said terminal bar 22, the upper terminal members 28 being connected to the leads 31 of the main telephone circuits, while the lower terminal members 30 are connected to the opposite leads 32 of the main telephone circuits.

The upper ends of the bolts or pins 26 are adapted to be engaged by the extremities of contact fingers 33 which are shown as arranged in two groups, one group being mounted upon the rocking bar 34, while the opposite group is mounted upon the rocking bar 35. These two rocking bars 34 and 35 are arranged in alinement with each other and are shown as hinged at 36 to the beforementioned hinge bar 21. The rear ends of the contact fingers 33 are connected by the conductors 37 to terminal members 38 secured to the top of the terminal bar 22 which is adjacent the hinge bar 21. As in the previous instance, similar and corresponding terminal members 39 are secured to the lower face of the said terminal bar 22. The terminal members 38 are connected to the main wires 40 of the telephone circuit, while the terminals 39 are connected to the opposite wires of the telephone circuit, each pair of the main telephone wires 40 and 41 leading to the usual telephone instrument in one of the rooms of the building, and each set of main telephone wires 40 and 41 being normally in communication with the corresponding main telephone leads 31 and 32. The various pairs of these main telephone circuit wires as they are carried away from the terminal bars 22 pass through the openings 23ᵃ in the perforated bars 23. The inner ends of the corresponding terminal members 30 and 39 which are secured to the lower faces of the two terminal bars 22 are connected by the cross wires 400, the said cross wires being carried around one side of the mechanism so as not to interfere with the contact fingers. The contact fingers 33 normally rest upon the upper ends of the bolts or pins 26 and all of the eight telephone circuits are then closed so that the telephones can be used in the ordinary manner. In tracing the circuit from the main lead 31, it may be followed to the terminal member 28, through the conductor 27 to the lower end of the bolt 26, through the contact fingers 33 to the conductor 37 and terminal member 38 to which the main telephone wire 40 is connected. The return circuit from the telephone may include the main wire 41 which leads to the terminal member 39, the cross wire 40 which connects each terminal 39 to the corresponding opposite terminal 30, which is in turn connected to the opposite main wire 32.

A second set of contact fingers 41[a], corresponding to the contact fingers 33 project from the lower sides of the rocking bars 34 and 35, the rear ends of the said contact fingers 41[a] being connected by the conductors 42 to the terminal members 39. The lower face of the contact carrying bar 20 is provided with a longitudinally disposed contact strip 43 which occupies a spaced and parallel relation with respect thereto, the ends of the contact strip being bent upwardly and secured to the bar 20, and the said strip being connected by a wire 44 to one of the terminals 45 of the ringing circuit 46. The opposite terminal 45 of the ringing circuit is connected by a wire 47 to a second contact strip 48 which is arranged above the contact carrying bar 20 and has a spaced and parallel relation thereto. This upper contact strip 48 is adjustably mounted so that it can be raised and lowered as may be required, and for this purpose the ends of the strip are shown as engaged by clamping bolts 49 which operate within slotted standards 50 projecting from opposite ends of the contact carrying bar 20. As indicated by full lines upon Fig. 3, the two rocking bars 34 and 35 normally assume such a position that the upper contact fingers 33 are moved downwardly into engagement with the upper ends of the bolts 26 and out of engagement with the upper contact strip 48, while the lower contact fingers 41[a] occupy a position below and spaced from the lower contact strip 43. As has been previously shown, all of the main telephone circuits are then closed so that the telephone may be employed in the usual manner without interference by the alarm mechanism. However, when the rocking bars 34 and 35 are tilted so as to swing the contact fingers 33 upwardly into engagement with the upper contact strip 48 and simultaneously bring the lower contact fingers 41 into engagement with the lower contact strip 43, the main telephone circuits will be broken and the main telephone wires 40 and 41 of each of the telephones introduced into the ringing circuit 46. This result follows from the fact that the two wires 44 and 47 leading from the terminals 45 of the ringing circuit are connected to the respective contact strips 43 and 48, while the upper contact fingers 33 which now engage the upper contact strip 48 are connected by the conductors 37 to the terminal members 38 and telephone wires 40, while the lower contact fingers 41 which are in engagement with the lower contact strip 43 are connected by the conductors 42 to the terminal members 39 and opposite telephone wires 41.

The end of the rocking bar 34 is provided with a lateral arm 51 carrying a shoe 52 which rides upon the periphery of a notched disk 53 which is rigid with the main operating shaft 10. A spring 54 connects the end of the arm 51 to the base 1 and normally tends to hold the shoe 52 in a yielding engagement with the notched disk 53. This notched disk 53 is formed with a flat side 53[a] and a series of peripheral notches 53[b], the shoe 52 of the arm 51 normally resting upon the flat side 53[a] of the disk when the alarm mechanism is not in operation. In a somewhat similar manner the other rocking bar 35 is provided with a lateral arm 55 which engages a lateral finger 56 projecting from the extremity of a lever 57 which is pivoted at 58 upon the frame of the spring motor 9, the said lateral finger 56 providing a shoe which is adapted to engage the periphery of a second notched disk 60 on the main operating shaft 10. This disk 60 is provided with a flat face 60[a] and a series of peripheral teeth 60[b], the finger 56 normally engaging the flat face 60[a] when the device is not in operation.

It has been previously described that when the motor 9 is set in operation by energizing the electromagnet 2 and causing the releasing lever 6 to be manipulated, the shaft 10 will be given one complete revolution before the motor is shut off. As the shaft revolves, the notched disks 53 and 60 will also revolve so as to cause the shoe 52 to successively ride upon the teeth 53[b] of the disk and drop into the recesses between the teeth, and in a similar manner cause the finger 56 to successively ride upon the teeth 60[b] of the disk 60 and drop into the recesses between the teeth. This will operate through the lateral arm 51 to swing the rocking bar 34 back and forth and through the arm 55 to swing the rocking bar 35 back and forth, each back and forth swinging movement of the rocking bars 34 and 35 serving as has been previously described to move the contact fingers 33 and 41 into and out of engagement with the respective contact strips 48 and 43 so as to introduce all of the telephones into the ringing circuit and cause the bells thereof to be sounded. As the shaft 10 makes one complete revolution, each of the telephone bells will be sounded once for each of the teeth upon the disks 53 and 60, and in the present instance each of these disks is shown as provided with five teeth so that each of the telephone bells would be sounded five times. The teeth 53[b] of the disk 53 are arranged alternately with respect to the teeth 60[b] of the disk 60 so that the two rocking bars 34 and 35 will be operated successively, thereby only interrupting a portion of the main telephone circuits at one time. After the shaft 10 has completed its revolution so that the extremity of the spring arm 14 has again entered the notch 15 of the disk 16 and the detent 13 engaged the governor wheel 11 to stop the motor, the flat faces 53ª and 60ª of the respective disks 53 and 60 will be in operative position so as to permit the upper contact fingers 33 of each of the rocking bars 34 and 35 to rest upon the upper ends of the bolts or pins 26 and close the main telephone circuits. The telephones may then be again used without interruption, since the device is entirely automatic in its action and requires no attention whatever on the part of the telephone operator after the spring motor has once been released and set in motion.

It may be stated that the term telephone circuits as employed throughout the specification and claims has been used in a generic sense and is intended to include any bell or alarm circuits of any character whatsoever to which the present device might be applied. The invention has been illustrated, for the sake of convenience, as applied to telephone circuits, although it will be obvious that it can be interposed with equal facility into any bell or alarm circuits.

I claim:

1. An alarm attachment for telephone systems comprising a plurality of telephone circuit terminals, a plurality of ringing circuit terminals, an operating shaft, switch means for breaking the telephone circuits and closing the ringing circuits, means actuated by the operating shaft for operating said switch means, means for driving the operating shaft, and means for automatically terminating the driving of said shaft after the alarm has been sounded.

2. An alarm attachment for telephone systems comprising a plurality of telephone circuit terminals, a plurality of ringing circuit terminals, an operating shaft, switch means for breaking the telephone circuits and closing the ringing circuits, means actuated by the operating shaft for operating said switch means, a motor for driving the operating shaft, manually-controlled means for setting the motor in operation, and means thereafter operating automatically to stop the motor when the alarm has been sounded.

3. An alarm attachment for telephone circuits including a rocking bar, a pair of spaced contact fingers carried by the rocking bar, a contact adapted to be engaged by one of the said fingers when the bar is rocked in one direction, the said contact finger and contact being interposed in one of the wires of the telephone circuit, connections between the opposite contact finger and the opposite wire of the telephone circuit, a ringing circuit, contact bars connected to the terminals of the ringing circuit and arranged to be engaged by the respective contact fingers when the rocking bar is swung in the opposite direction, and means for causing the rocking bar to oscillate a predetermined number of times when set in motion.

4. An alarm attachment for telephone circuits including a ringing circuit, an operating shaft, a rocking bar, switch means actuated by the oscillations of the rocking bar for successively breaking the telephone circuit and introducing the telephone into the ringing circuit, means actuated by the operating shaft for oscillating the rocking bar, a motor for driving the operating shaft, and means for automatically stopping the motor after a predetermined number of oscillations have been imparted to the rocking bar.

5. An alarm attachment for telephone circuits including contact fingers, contact strips adapted to be engaged by the contact fingers when moved in one direction, a ringing circuit having the terminals thereof connected to the contact strips, a contact member adapted to be engaged by one of the contact fingers when the contact fingers are moved in the opposite direction, the said contact member and corresponding contact finger being introduced into one of the wires of the main telephone circuit, and means for reciprocating the contact fingers.

6. An alarm attachment for telephone circuits including a rocking bar, a pair of contact fingers carried by the rocking bar, a contact adapted to be engaged by one of the said fingers when the bar is rocked in one direction, the said contact finger and contact being interposed in one of the wires of the telephone circuit, and connections between the opposite contact finger and the opposite wire of the telephone circuit, a ringing circuit, and contact bars connected to the terminals of the ringing circuit and arranged to be engaged by the respective contact fingers when the rocking bar is swung in the opposite direction.

7. An alarm attachment for telephone circuits including a rocking bar, a pair of contact fingers carried by the rocking bar, a contact adapted to be engaged by one of the fingers when the bar is rocked in one direction, a pair of terminal bars, a pair of terminal members applied to each of the terminal bars, one set of terminal members having the telephone wires connected thereto, while the opposite set of terminal members have the telephone circuit wires connected thereto, a conductor connecting one of the terminal members to the before-mentioned contact member, conductors connecting each of the contact fingers with the respective terminal members of the other terminal bar, a cross wire connecting corresponding terminal members of the two terminal bars, a ringing circuit, and contact strips connected to the terminals of the ringing circuit and arranged to be engaged by the respective contact fingers when the rocking bar is swung in the opposite direction.

8. An alarm attachment for telephone circuits including a plurality of telephone circuits, a rocking bar, a pair of contact fingers upon the rocking bar for each of the telephone circuits, a contact member for each pair of contact fingers, said contact members being adapted to be engaged by one of the fingers of each pair when the rocking bar is swung in one direction and the said contact members and fingers being interposed in one of the wires of the telephone circuits, connections between the opposite contact finger of each pair and the opposite wire of the corresponding telephone circuit, a ringing circuit, and contact strips connected to the terminals of the ringing circuit and arranged to be engaged by the respective contact fingers of each pair when the rocking bar is swung in the opposite direction.

9. An alarm attachment for telephone circuits including a plurality of telephone circuits, a contact carrying bar, a contact thereon for each of the telephone circuits, a rocking bar, a pair of fingers upon the rocking bar for each of the contacts, one of the fingers of each pair being normally in engagement with the said contact, a pair of terminal bars, two sets of terminal members upon each terminal bar, the terminal members on one bar having the respective telephone wires of the different circuits connected thereto, while the terminal members of the opposite bar have the main wires of the telephone circuits connected thereto, cross wires between one set of corresponding terminal members upon the terminal bars, conductors between the opposite terminal members of one terminal bar and the contacts of the contact bar, conductors between the contact fingers and the terminal members of the opposite terminal bar, a ringing circuit, and contact strips connected to the terminals of the ringing circuit and adapted to be engaged by the respective contact fingers when the rocking bar is moved to disengage the contact fingers from the before-mentioned contacts.

10. An alarm attachment for telephone circuits including a rocking bar, a pair of contact fingers carried by the rocking bar, a contact adapted to be engaged by one of the fingers when the bar is rocked in one direction, the said contact finger and contact being interposed in one of the wires of the telephone circuit, a connection between the opposite contact finger and the opposite wire of the telephone circuit, a ringing circuit, contact strips connected to the terminals of the ringing circuit and arranged to be engaged by the respective contact fingers when the rocking bar is swung in the opposite direction, a main shaft, means actuated by the rotation of the main shaft for swinging the rocking bar back and forth, and means for driving the main shaft.

11. An alarm attachment for telephone circuits including a rocking bar, a pair of contact fingers carried by the rocking bar, a contact adapted to be engaged by one of the fingers when the bar is rocked in one direction, the said contact finger and contact being interposed in one of the wires of the telephone circuit, connection between the opposite contact finger and the opposite wire of the telephone circuit, a ringing circuit, contact strips connected to the terminals of the ringing circuit and arranged to be engaged by the respective contact fingers when the rocking bar is swung in one direction, an operating shaft, a toothed disk upon the operating shaft, a shoe riding upon the periphery of the toothed disk, means actuated by the shoe for operating the rocking bar, and means for driving the shaft.

12. An alarm attachment for telephone circuits including a rocking bar, a pair of contact fingers carried by the rocking bar, a contact adapted to be engaged by one of the fingers when the bar is rocked in one direction, the said contact finger and contact being interposed in one of the wires of the telephone circuit, connections between the opposite contact finger and the opposite wire of the telephone circuit, a ringing circuit, contact strips connected to the terminals of the ringing circuit and arranged to be engaged by the respective contact fingers when the rocking bar is swung in the opposite direction, an operating shaft, a disk rigid with the operating shaft and provided with a plurality of cam faces, a shoe adapted to ride upon the cam faces of the disk, means actuated by the shoe for operating the rocking bar, a motor for rotating the operating shaft, and means for releasing the motor.

13. An alarm attachment for telephone circuits including a ringing circuit, an operating shaft, a rocking bar, switch means actuated by the rocking bar for breaking the telephone circuit and introducing the telephone into the ringing circuit, means actuated by the operating shaft for actuating the rocking bar, a motor for driving the operating shaft, means for releasing the motor, and means for automatically stopping the motor after the alarm has been sounded.

14. An alarm attachment for telephone circuits including a ringing circuit, a rocking bar, switch means actuated by the rocking bar for breaking the telephone circuit and introducing the telephone into the ringing circuit, an operating shaft, means operated by the said shaft for actuating the rocking bar, a motor for driving the shaft, said motor including a toothed governor wheel, a detent adapted to engage the governor wheel, a notched disk upon the operating shaft, a spring arm engaging the notched disk and carrying the detent, the detent engaging the governor wheel when the end of the spring strip is seated within the notch of the disk, and means for withdrawing the spring arm from the notched disk to start the motor, the said spring arm then riding upon the periphery of the disk until the notch is again brought into position to be entered thereby.

15. In a telephone system comprising a central station and a plurality of subscribers' lines extending therefrom, the combination therewith at the central station of branch conductors for the respective lines, a source of signaling current for said branch conductors, said lines being normally continuous from the subscribers' stations to the points of junction with said branch conductors and beyond said points into the central station, and means to close circuits comprising said subscribers' lines practically simultaneously through said branch conductors and thereby to apply signaling current to operate the subscribers' signals.

16. In a telephone system comprising a central station and a plurality of subscribers' lines extending therefrom, the combination therewith at the central station of branch conductors for the respective lines, a source of signaling current for said branch conductors, switches by which said branch conductors may be connected to said lines, said lines being normally continuous from the subscribers' stations to said switches and beyond the same into the central station, and means to operate said switches practically simultaneously and thereby to apply signaling current to the subscribers' lines to operate the subscribers' signals.

17. In a telephone system comprising a central station and a plurality of subscribers' lines extending therefrom, the combination therewith of normally-closed switches in said lines, and means to open said switches practically simultaneously and at the same time to apply a source of signaling current to the subscribers' ends of said lines.

18. In a telephone system comprising a central station and a plurality of subscribers' lines extending therefrom, the combination therewith of a branch conductor, a source of signaling current therefor, and means to connect said branch conductor to all of said lines in a definitely fixed period of time of short duration at an intermediate point of each of said lines and thereby to send signaling current over all of said lines within said fixed period.

19. In a telephone system comprising a central station and a plurality of subscribers' lines extending therefrom, the combination therewith of a branch conductor, a source of signaling current therefor, means to connect said branch conductor to all of said lines in a definitely fixed period of time of short duration at an intermediate point of each of said lines and thereby to send signaling current over all of said lines within said fixed period, and means to terminate operation of said connecting means at the end of said fixed period.

20. In a telephone system comprising a central station and a plurality of subscribers' lines extending therefrom, the combination therewith of a branch conductor, a source of signaling current to be sent through said branch conductor, means to connect said branch conductor to all of said lines practically simultaneously at an intermediate point of each line, and means to operate said connecting means so as to send a predetermined sequence of impulses of signaling current through said branch conductor and into said lines in multiple and thereby to signal the subscribers accordingly.

21. In a telephone system comprising a central station and a plurality of subscribers' lines extending therefrom, the combination therewith of a branch conductor, a source of signaling current to be sent through said branch conductor, means to connect said branch conductor to all of said lines practically simultaneously at an intermediate point of each line, means to operate said connecting means so as to send a predetermined sequence of impulses of signaling current through said branch conductor and into said lines in multiple and thereby to signal the subscribers accordingly, and means terminating operation of said connecting means after a predetermined series of said impulses has been sent.

Signed at Sauk Center, Minnesota, U. S. A., this 24 day of February, 1915.

LOUIS A. MEYERS.

In presence of—
JOHN J. KELLY,
HARLEY PARIS.